No. 705,072. Patented July 22, 1902.
A. W. GRANT.
RUBBER TIRE.
(Application filed Mar. 23, 1900.)
(No Model.)
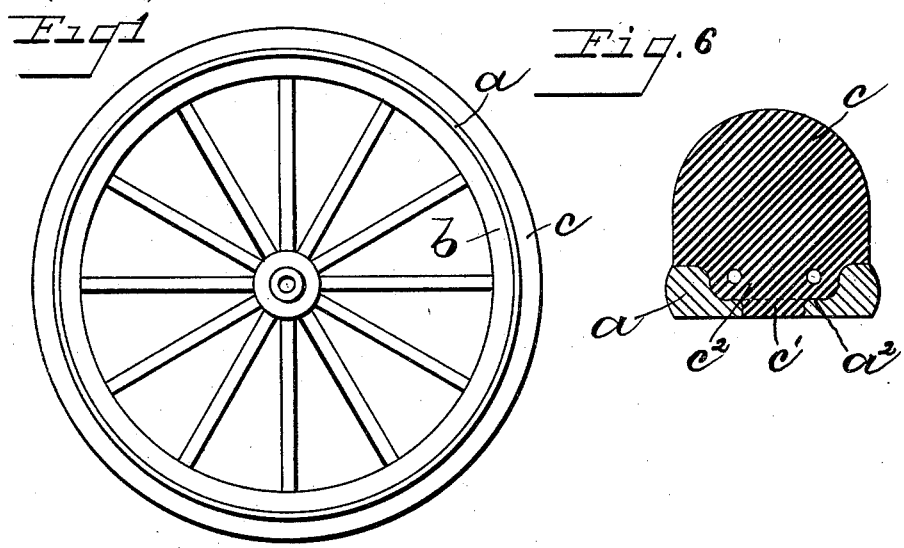
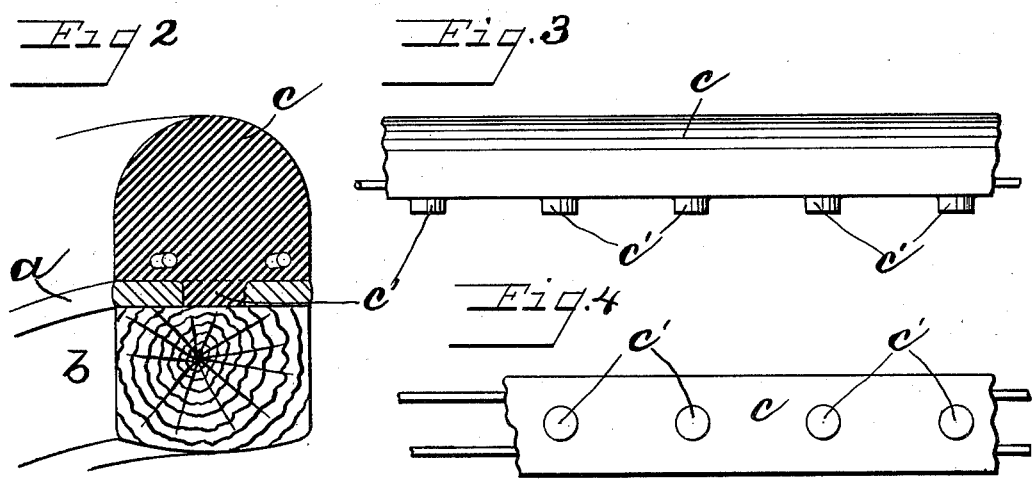
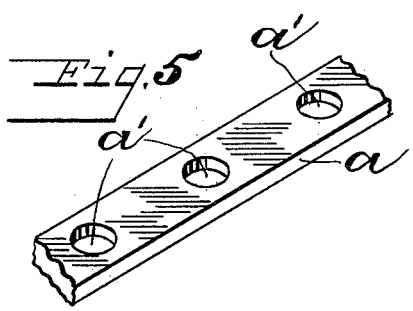
WITNESSES:
Frank L. Walker
Chas. I. Welch
INVENTOR:
Arthur W. Grant
BY
ATTORNEY

UNITED STATES PATENT OFFICE.

ARTHUR W. GRANT, OF SPRINGFIELD, OHIO, ASSIGNOR TO THE CONSOLIDATED RUBBER TIRE CO., OF NEW YORK, N. Y., A CORPORATION OF NEW JERSEY.

RUBBER TIRE.

SPECIFICATION forming part of Letters Patent No. 705,072, dated July 22, 1902.

Application filed March 23, 1900. Serial No. 9,946. (No model.)

*To all whom it may concern:*

Be it known that I, ARTHUR W. GRANT, a citizen of the United States, residing at Springfield, in the county of Clark and State of Ohio, have invented certain new and useful Improvements in Rubber Tires, of which the following is a specification.

My invention relates to improvements in rubber tires, and it especially relates to rubber tires particularly adapted for road-vehicles.

The object of my invention is to provide a rubber tire which may be applied directly to wheels already in use and placed on the ordinary metal tire with which said wheels are ordinarily equipped, the construction, however, being suitable for application to new wheels as well.

Like parts are represented by similar letters of reference in the several views of the drawings, in which—

Figure 1 represents a vehicle-wheel with my improved form of tire thereon. Fig. 2 is a cross-section of the wheel rim or felly with my improved tire thereon. Fig. 3 is a side view of the rubber tire removed. Fig. 4 is a bottom plan view of the same. Fig. 5 is a detail view in perspective showing a portion of the metallic tire or band on which the rubber is supported. Fig. 6 is a sectional view showing a slight modification.

In constructing my improved tire I employ a flat metallic band $a$, which is fitted to the wooden felly $b$ of a wheel in the usual manner, or it may constitute the rim of the wheel when the spokes are attached thereto in a well-known manner. This band $a$ is provided at suitable intervals with holes $a'$, which preferably extend entirely through the band. These holes may be punched or drilled in any suitable manner, the edges of the band being preferably slightly rounded, as shown in Figs. 2 and 6.

The rubber portion $c$ of this improved tire is preferably round at the top, with straight or substantially straight sides. It is formed straight across the bottom to fit the flat metallic band $a$, except that at intervals corresponding with the holes in the band $a$ there are provided round lugs or projections $c'$. There is extended through the rubber portion of the tire, preferably on each side of the projections $c'$, two independent retaining-wires, the ends of each of which are joined together to form independent retaining-bands.

In equipping a wheel with this rubber tire the metallic band is placed on the rim of the wheel, the holes being punched therein in advance, or they may be drilled therein after the metallic band is placed on the felly. The rubber is then cut either in a single strip or several strips, so as to fit around said wheel when properly compressed, and if compressed the projections $c'$ are placed sufficiently far apart so that when the rubber is compressed they will correspond to the openings $a'$ in the felly. The wires are then inserted through the rubber and the ends of the wires united together, after which the tire is put onto the wheel with the projections in the rubber fitting into the holes in the rim, the tire being thus put onto the wheel as far as it may be by hand until the projections are brought up against the metallic rim. A thin metallic plate or plates being inserted between the rubber and the steel of the tire the projections $c'$ will be forced upward into the body of the rubber and permit the tire to be slipped onto the rim, after which the plate or plates are removed and the projections will by the elasticity of the rubber be forced into the openings in the metallic band, when the tire will be held in place by means of the retaining-wires and the projections fitting into the holes in the metallic band.

This tire has been found in practice to afford under ordinary circumstances the usual amount of freedom necessary to resist and overcome the lateral shocks applied thereto, and at the same time the projections not only prevent the lateral displacement of the tire, but also prevent the creeping or traveling thereof about the periphery of the wheel, the retaining-wires being placed on opposite sides of the projections to permit the projections to be pressed into the body of the tire for assembling the same.

In Fig. 6 the same construction is shown as applied to a rim $a$, which has a central groove or depression $a^3$, the rubber being provided with a longitudinal tongue or rib $c^2$, which fits this groove. In this construction the retaining-wires may be preferably placed within the tongue or rib, and the projections $c'$ will be placed at longer intervals apart, as in this case the projections are used simply for preventing the longitudinal or creeping movement of the tire about the periphery of the wheel.

Having thus described my invention, I claim—

1. In a vehicle-tire, the combination with a flat channelless metallic band having openings therein, of a rubber tire, flat on its base, to fit said metallic band, with projections thereon to fit in the openings in said band, and independent retaining-wires extending through said rubber, substantially as specified.

2. In a tire for vehicle-wheels, a rubber tire with a substantially flat base, having projections formed on said base, and flat metallic band having openings therein to receive the projections on the tire, the edges of said band being rounded, the rounded part extending beyond the tire and the felly on which it rests, and independent retaining-wires extending through the rubber on opposite sides of said projections, substantially as specified.

In testimony whereof I have hereunto set my hand this 16th day of March, A. D. 1900.

ARTHUR W. GRANT.

Witnesses:
CHAS. I. WELCH,
EDMOND J. OGDEN.